US011792200B2

(12) United States Patent
Patel et al.

(10) Patent No.: US 11,792,200 B2
(45) Date of Patent: Oct. 17, 2023

(54) METHOD AND SYSTEM FOR REMOTELY VERIFYING IDENTITY PRIOR TO PROVISIONING A DATA RECORD FOR A SERVICE

(71) Applicant: The Toronto-Dominion Bank, Toronto (CA)

(72) Inventors: Tina Patel, Brampton (CA); Nipaben Shelat, Brampton (CA)

(73) Assignee: The Toronto-Dominion Bank, Toronto (CA)

( * ) Notice: Subject to any disclaimer, the term of this patent is extended or adjusted under 35 U.S.C. 154(b) by 227 days.

(21) Appl. No.: 17/197,130

(22) Filed: Mar. 10, 2021

(65) Prior Publication Data

US 2022/0294792 A1    Sep. 15, 2022

(51) Int. Cl.
  *H04L 29/06* (2006.01)
  *H04L 9/40* (2022.01)

(52) U.S. Cl.
  CPC ........ *H04L 63/102* (2013.01); *H04L 63/0861* (2013.01); *H04L 63/107* (2013.01)

(58) Field of Classification Search
  None
  See application file for complete search history.

(56) References Cited

U.S. PATENT DOCUMENTS

| 7,817,988 | B2 | 10/2010 | Kruis et al. |
| 7,966,492 | B1 | 6/2011 | Gasparini et al. |
| 8,413,219 | B2 | 4/2013 | Downey et al. |
| 9,047,473 | B2 | 6/2015 | Samuelsson et al. |
| 9,083,700 | B2 | 7/2015 | James |
| 9,684,782 | B2 | 6/2017 | Yang et al. |
| 10,140,445 | B2 * | 11/2018 | Suzuki ............... G06F 21/41 |
| 10,498,720 | B2 | 12/2019 | Moran et al. |
| 11,063,770 | B1 * | 7/2021 | Peng .................. G06F 21/64 |
| 2003/0187925 | A1 * | 10/2003 | Inala .................. G06F 16/957 709/204 |
| 2007/0174810 | A1 * | 7/2007 | Hockenberry ........... G06F 8/20 717/100 |

(Continued)

FOREIGN PATENT DOCUMENTS

CA    3091380    *  8/2020

*Primary Examiner* — Piotr Poltorak
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to receive, via the communications module and from a remote computing device, a signal including a request to provision a data record for a service; select digital identity network verification as a primary verification technique; attempt verification using the primary verification technique; determine that verification using the primary verification technique has failed; responsive to determining that verification using the primary verification technique has failed, attempt verification using a secondary verification technique; determine successful verification using the secondary verification technique; and responsive to successful verification using the secondary verification technique, provision the data record for the service.

16 Claims, 9 Drawing Sheets

(56) References Cited

U.S. PATENT DOCUMENTS

| | | | | |
|---|---|---|---|---|
| 2013/0276078 A1* | 10/2013 | Rockwell | ............. | H04L 63/102 |
| | | | | 726/7 |
| 2016/0088068 A1* | 3/2016 | Toy | .................... | H04L 63/0272 |
| | | | | 709/219 |
| 2017/0171216 A1* | 6/2017 | Chhabra | ................. | H04L 63/08 |
| 2018/0293556 A1* | 10/2018 | Hyun | ................ | G06Q 20/3678 |

* cited by examiner

METHOD AND SYSTEM FOR REMOTELY VERIFYING IDENTITY PRIOR TO PROVISIONING A DATA RECORD FOR A SERVICE

TECHNICAL FIELD

The present application relates to methods and systems for remotely verifying identity prior to provisioning a data record for a service.

BACKGROUND

Verifying the identity of a user is often done using, for example, government issued identification. Verifying the identity of the user typically requires that the user be physically present and this process may be time consuming and inefficient.

Verifying the identity of a user is even more difficult when the verification is to be done remotely.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
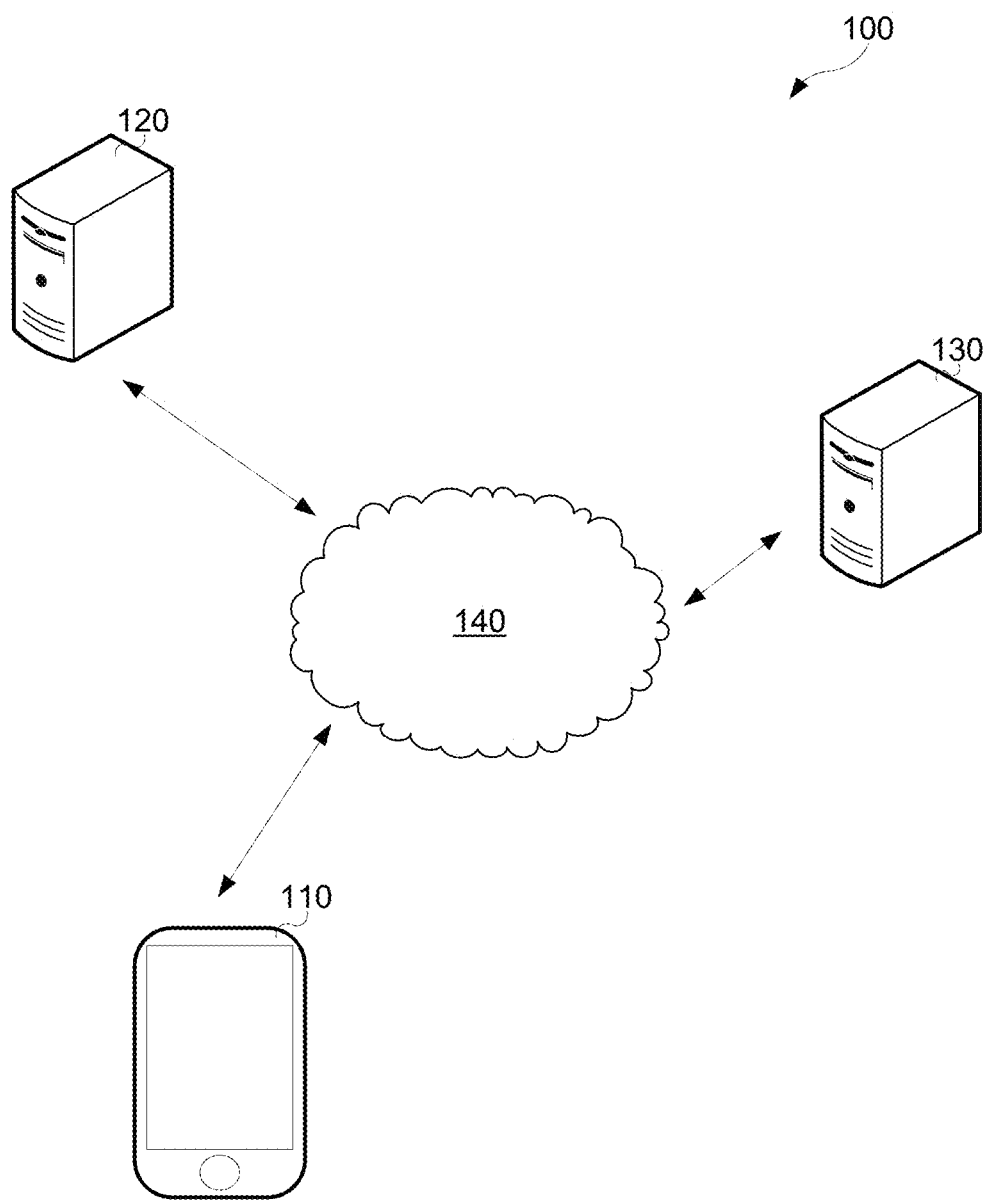
FIG. 1 is a schematic operation diagram illustrating an operating environment of an example embodiment.

In one aspect there is provided a server computer system comprising a communications module; a processor coupled with the communications module; and a memory coupled to the processor and storing processor-executable instructions which, when executed by the processor, configure the processor to receive, via the communications module and from a remote computing device, a signal including a request to provision a data record for a service; select digital identity network verification via a digital identity network as a primary verification technique; attempt verification using the primary verification technique; determine that verification using the primary verification technique has failed; responsive to determining that verification using the primary verification technique has failed, attempt verification using a secondary verification technique; determine successful verification using the secondary verification technique; and responsive to successful verification using the secondary verification technique, provision the data record for the service.

In one or more embodiments, the processor-executable instructions, when executed by the processor, further configure the processor to send, via the communication module and to the remote computing device, a signal requesting information associated with a user requesting to provision the data record for the service; receive, via the communications module and from the remote computing device, a signal including the requested information; determine that the requested information satisfies predefined criteria; and responsive to determining that the requested information satisfies predefined criteria, select digital identity network verification as the primary verification technique.

In one or more embodiments, the requested information includes information relating to one or more other data records of the user.

In one or more embodiments, the processor-executable instructions, when executed by the processor, further configure the processor to send, via the communication module and to the remote computing device, a signal requesting confirmation that the user has one or more data records associated with one or more members of the digital identity network; receive, via the communications module and from the remote computing device, a signal including confirmation that the user has one or more data records associated with one or more members of the digital identity network; and select digital identity network verification as the primary verification technique based on the confirmation.

In one or more embodiments, the digital identity network includes a permissioned blockchain network.

In one or more embodiments, the secondary verification technique does not require the digital identity network.

In one or more embodiments, when attempting verification using the primary verification technique, the processor-executable instructions, when executed by the processor, further configure the processor to send, via the communications module and to a server associated with the digital identity network, a request for verified identity data of a user.

In one or more embodiments, the processor-executable instructions, when executed by the processor, further configure the processor to receive, via the communications module and from the server associated with the digital identity network, a signal indicating that the request for verified identity data of the user has failed; and responsive to receiving the signal indicating that the request for verified identity data of the user has failed, determine that verification using the primary verification technique has failed.

In one or more embodiments, when attempting verification using the secondary technique, the processor-executable instructions, when executed by the processor, further configure the processor to obtain, via the communications module and from the remote computing device, image data including a first image of a user and an image of an identity document that includes a second image of the user; analyze the image data to determine that the first image of the user and the second image of the user correspond to a same user; and responsive to determining that the first image of the user and the second image of the user correspond to the same user, determine successful verification.

In one or more embodiments, when attempting verification using the secondary technique, the processor-executable instructions, when executed by the processor, further configure the processor to obtain, via the communications module and from the remote computing device, an internet protocol address of the remote computing device; determine a location of the remote computing device based at least on the internet protocol address; and compare the determined location of the remote computing device to a known address of the user to determine successful verification.

In another aspect there is provided a computer-implemented method comprising receiving, via a communications module and from a remote computing device, a signal including a request to provision a data record for a service; selecting digital identity network verification via a digital identity network as a primary verification technique; attempting verification using the primary verification technique; determining that verification using the primary verification technique has failed; responsive to determining that verification using the primary verification technique has failed, attempting verification using a secondary verification technique; determining successful verification using the secondary verification technique; and responsive to successful verification using the secondary verification technique, provisioning the data record for the service.

In one or more embodiments, the method further comprises sending, via the communication module and to the remote computing device, a signal requesting information associated with a user requesting to provision the data record for the service; receiving, via the communications module and from the remote computing device, a signal including the requested information; determining that the requested information satisfies predefined criteria; and responsive to determining that the requested information satisfies predefined criteria, selecting digital identity network verification as the primary verification technique.

In one or more embodiments, the requested information includes information relating to one or more other data records of the user.

In one or more embodiments, the method further comprises sending, via the communication module and to the remote computing device, a signal requesting confirmation that a user has one or more data records associated with one or more members of the digital identity network; receiving, via the communications module and from the remote computing device, a signal including confirmation that the user has one or more data records associated with one or more members of the digital identity network; and selecting digital identity network verification as the primary verification technique based on the confirmation.

In one or more embodiments, the digital identity network includes a permissioned blockchain network.

In one or more embodiments, the secondary verification technique does not require the digital identity network.

In one or more embodiments, attempting verification using the primary verification technique comprises sending, via the communications module and to a server associated with the digital identity network, a request for verified identity data of a user.

In one or more embodiments, the method further comprises receiving, via the communications module and from the server associated with the digital identity network, a signal indicating that the request for verified identity data of the user has failed; and responsive to receiving the signal indicating that the request for verified identity data of the user has failed, determining that verification using the primary verification technique has failed.

In one or more embodiments, attempting verification using the secondary technique comprises obtaining, via the communications module and from the remote computing device, image data including a first image of a user and an image of an identity document that includes a second image of the user; analyzing the image data to determine that the first image of the user and the second image of the user correspond to a same user; and responsive to determining that the first image of the user and the second image of the user correspond to the same user, determining successful verification.

In another aspect there is provided a non-transitory computer readable storage medium comprising computer-executable instructions which, when executed, configure a processor to receive, via a communications module and from a remote computing device, a signal including a request to provision a data record for a service; select digital identity network verification via a digital identity network as a primary verification technique; attempt verification using the primary verification technique; determine that verification using the primary verification technique has failed; responsive to determining that verification using the primary verification technique has failed, attempt verification using a secondary verification technique; determine successful verification using the secondary verification technique; and responsive to successful verification using the secondary verification technique, provision the data record for the service.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

When a user submits a request to provision a data record for a service hosted by an institution, the institution may be required to verify the identity of the user to fulfil, for example, Know Your Customer (KYC) requirements. Most institutions require at least two criteria to be completed to verify the identity of the user: 1) the institution obtains identity information of the user, and 2) the institution verifies the user's identity. The identity information may be obtained electronically but verification may require the user to visit the institution to show identification verifying their identity. Once the identity of the user has been verified, the data record may be provisioned for the service.

Some institutions may attempt to remotely verify the identity of the user by, for example, obtaining credit data of the user. This technique, however, is not always reliable.

In the following, a system is described that allows remote users to request that the institution provision a data record for a service. Prior to the data record being provisioned for the service, the system may attempt to remotely verify the identity of the user through use of a primary verification technique that may include digital identity network verification via a digital identity network. In the event that the verification using the primary verification technique fails, the system may attempt to verify the identity of the user through use of a secondary verification technique. Responsive to successful verification of the user using the secondary verification technique, the data record may be provisioned for the service.

FIG. 1 is a block diagram illustrating an operating environment of an example embodiment. Various components cooperate to provide a system 100 which may be used, for example, remotely verify identity prior to provisioning a data record for a service. As shown, the system 100 includes a computing device 110, a server computer system 120 and a digital identity network server 130 coupled to one another through a network 140, which may include a public network such as the Internet and/or a private network.

The computing device 110 is a computer system. The computing device 110 may be, for example, a smartphone as shown. The computing device 110 may, however, be a computing device of another type such as for example a personal computer, a laptop computer, a tablet computer, a notebook computer, a hand-held computer, a personal digital assistant, a portable navigation device, a mobile phone, a smart phone, a wearable computing device (e.g. a smart watch, a wearable activity monitor, wearable smart jewelry, a glasses and other optical devices that include optical head-mounted displays), and any other type of computing device that may be configured to store data and software instructions, and execute software instructions to perform operations consistent with disclosed embodiments. In certain embodiments, the computing device 110 may be adapted to present a graphical user interface that allows for communication with the server computer system 120. The computing device 110 is remote from the server computer system 120.

The server computer system 120 may be a financial institution server which may maintain customer bank accounts. That is, the server computer system 120 may maintain a database that includes various data records. A data record may be provisioned for a particular service. For example, a data record may be provisioned as a chequing account, a savings account, an investment account or a credit card account. A data record may, for example, reflect an amount of value stored in a particular account.

Each account maintained by the server computer system 120 may be associated with authentication information. The authentication information may be or may include any one or more of a token, a username, a password, a personal identification number (PIN), biometric data, etc. The authentication information may be used by the server computer system 120 to authenticate a device such as for example the computing device 110. More specifically, the authentication information may be used to determine that the computing device 110 is being operated by an authorized user and to identify the one or more accounts the user is trying to access.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The digital identity network server 130 is a server associated with a digital identity network. Although the digital identity network server 130 is illustrated as a single block, it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other types of contact information.

Accordingly, at least some verified nodes may write to the blockchain. At least some of the blocks written to the blockchain may be related to verified identity data. The digital identity network server 130 may store verified identity data associated with a plurality of users. In at least some embodiments, verified identity data may not be included in the blockchain. Instead, the blocks may store a private secret that is related to such verified identity data. The private secret may act as proof to the existence of the verified identity data and may be used to verify the authenticity of the verified identity data. For example, in at least some embodiments, the private secret may be a hash of the verified identity data such that, when the verified identity data is provided to another system (i.e., a system apart from the verified node maintaining the identity data), it may be verified from the hash stored in a block on the blockchain.

The blockchain network may, for example, be implemented using Hyperledger Fabric, for example. It will, however, be appreciated that the blockchain network may take other forms.

Within the digital identity network, of which the digital identity network server 130 is associated, trusted partners may act as digital asset providers and digital asset consumers. In actions as a digital asset provider, a trusted member of the digital identity network may provide information about a particular user or customer to another trusted member of the digital identity network (e.g. a digital asset consumer). The information about the particular user or customer may include verified identity data. The requested information may be provided through the digital identity network via the digital identity network server 130 in a blind manner such that the digital asset provider does not know the identity of the digital asset consumer and such that the digital asset consumer does not know the identity of the digital asset provider.

The network 140 is a computer network. In some embodiments, the network 140 may be an internetwork such as may be formed of one or more interconnected computer networks. For example, the network 140 may be or may include an Ethernet network, an asynchronous transfer mode (ATM) network, a wireless network, a telecommunications network, or the like.

The system may additionally include one or more third party servers and the server computer system 120 may communicate with the one or more third party servers via the network 140.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
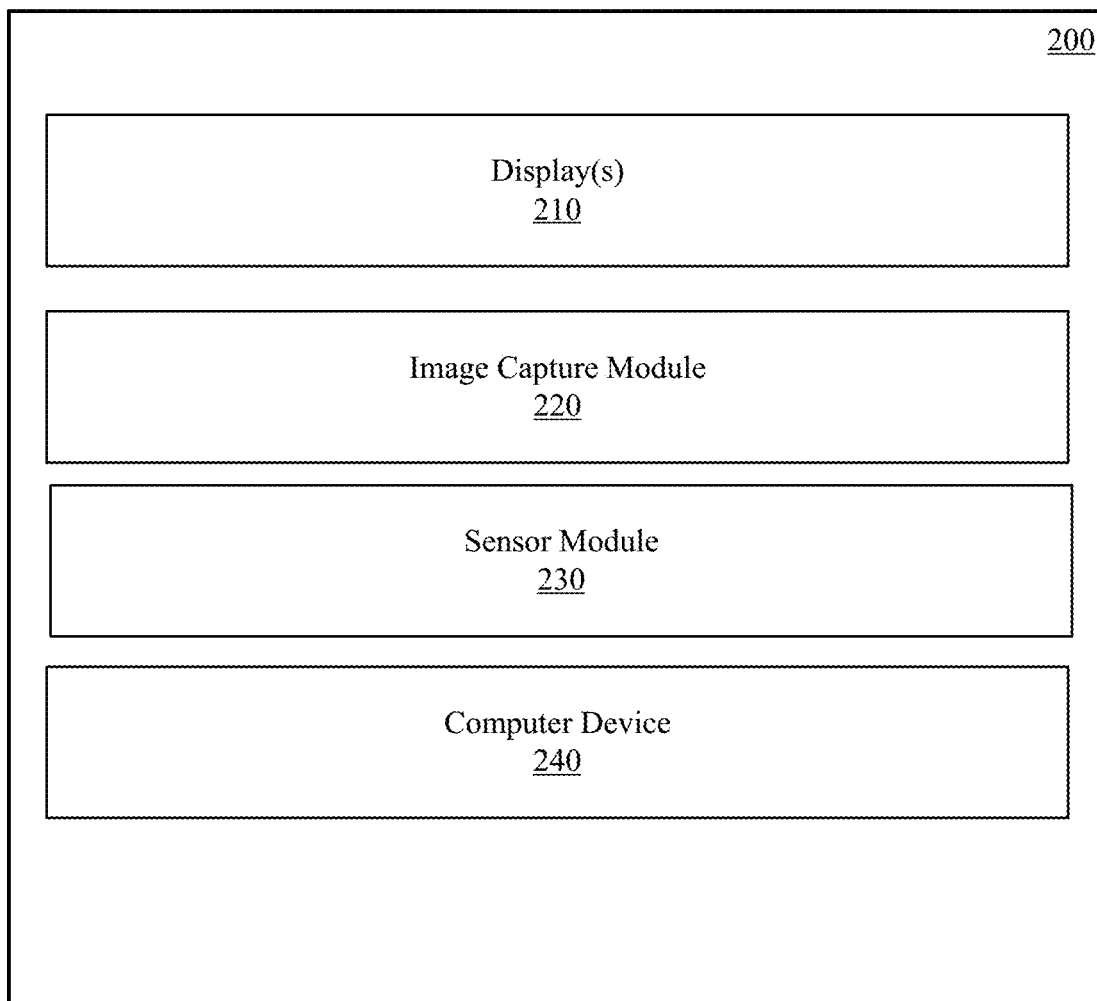
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
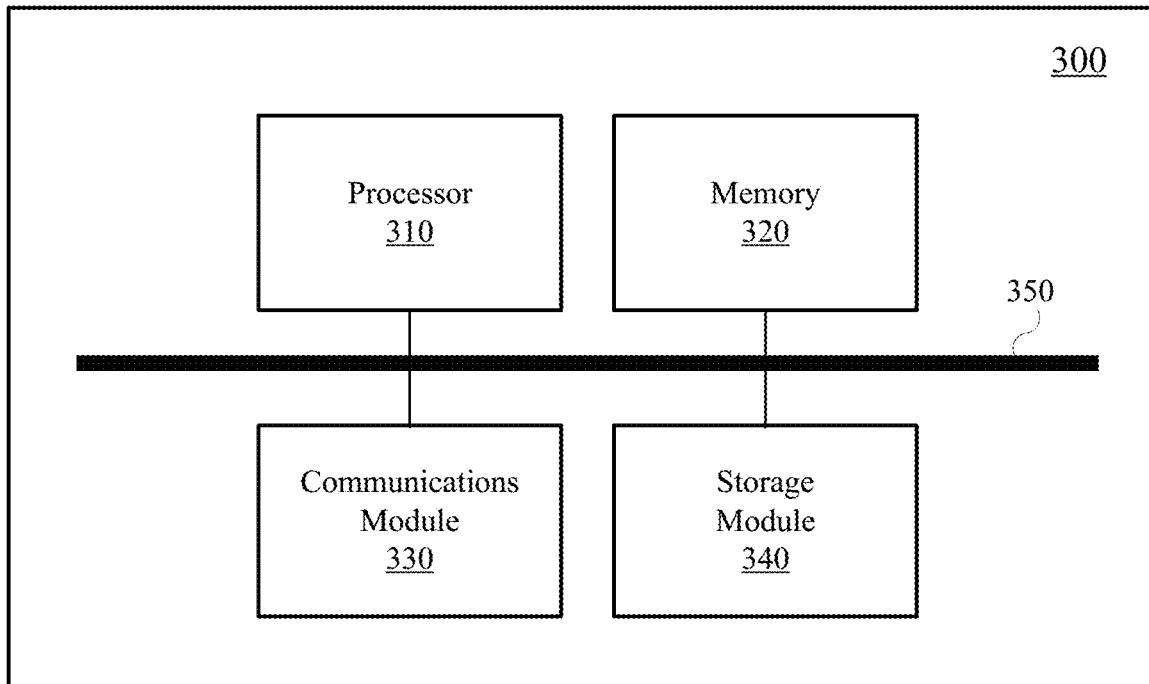
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server computer system 120, and the digital identity network server 130 (or a node of the digital identity network).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
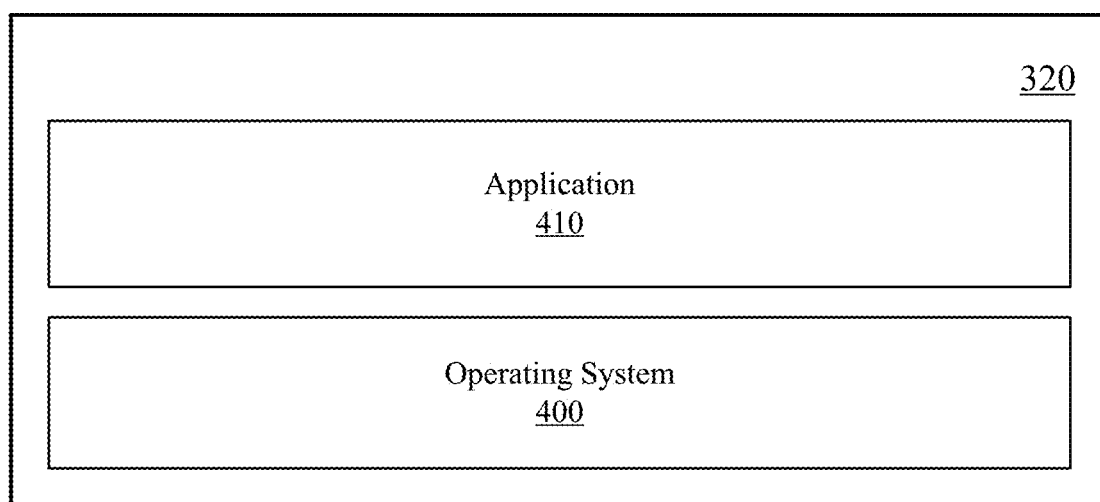
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server computer system 120, and/or the digital identity network server 130 (or a node of the digital identity network).

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server computer system 120 and may provide various banking functions such as, for example, the ability to submit a request that to provision a data record for a service, display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the computing device 110, the applications 410 may include a web browser, which may also be referred to as an Internet browser. In at least some such embodiments, the server computer system 120 may be a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to submit a request that to provision a data record for a service, display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the computing device 110, the applications 410 may include an electronic messaging application. The electronic messaging application may be configured to display a received electronic message such as an email message, short messaging service (SMS) message, or a message of another type. In at least some embodiments, the server computer system 120 or digital identity network server 130 may be configured, through computer-executable instructions, to send a message to the computing device 110. For example, the server computer system 120 may be configured to send a SMS message to a phone number associated with a user and an electronic messaging application on the computing device 110 may be configured to retrieve the message and display the message to the user.

The user may open the mobile banking application or the web browser on the computing device 110. In response, the server 120 may send a signal to the computing device 110 causing the computing device 110 to display a graphical user interface (GUI). The GUI may be used to communicate with the server 120. Where the user has an existing account, the user may be prompted to authenticate by entering, for example, a username and password.

In embodiments where the user is not an existing customer of the financial institution associated with the server computer system 120, the user may be required to create an account. For example, the GUI displayed on the computing device 110 may include a selectable option that, when selected, initiates account creation. Responsive to the user selecting the selectable option by, for example, performing a tap gesture at a location on a display screen of the computing device 110 corresponding to a location of the selectable option, the computing device 110 may display one or more input fields that may be used to enter information associated with creating an account. Information associated with creating an account may include a username, a password, an email address, a phone number, a mailing address, etc.

Responsive to the user submitting the information associated with creating the account, the server computer system 120 receives, via the communication module and from the computing device 110, a signal including the information associated with creating the account. Using the information associated with creating the account, the server computer system 120 may create the account. Once the account has been created, the account may be associated with one or more data records. The server computer system 120 may provision each data record for a particular service and this may be based on a request received from the computing device 110.

Prior to provisioning a data record for a particular service, the financial institution associated with the server computer system 120 may be required to verify the identity of the user to fulfill, for example, know-your-customer (KYC) requirements. It will be appreciated that remotely verifying the identity of the user may only be required where the user has not been previously verified by the financial institution associated with the server computer system 120. For example, only new customers may require identity verification.

Figure 5:
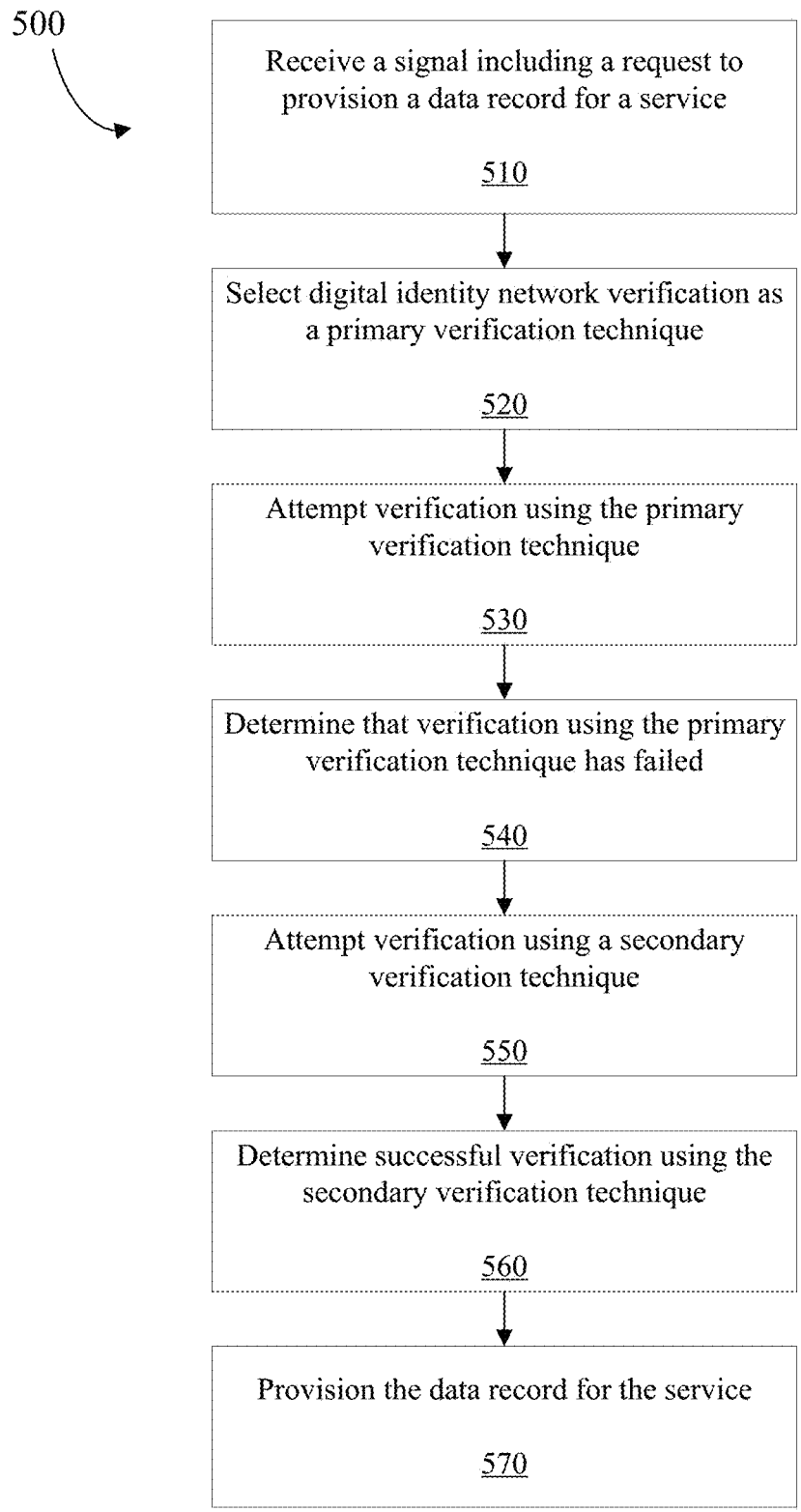
FIG. 5 is a flowchart showing operations performed by a server in remotely verifying identity prior to provisioning a data record for a service according to an embodiment.

FIG. 5 is a flowchart showing operations performed by the server computer system 120 in remotely verifying identity prior to provisioning a data record for a service according to an embodiment. The operations may be included in a method 500 which may be performed by the server computer system 120. For example, computer-executable instructions stored in memory of the server computer system 120 may, when executed by one or more processors, configure the server computer system 120 to perform the method 500 or a portion thereof.

The server computer system 120 receives, via the communications module and from a remote computing device, a signal including a request to provision a data record for a service (step 510). In this embodiment, the remote computing device may be the computing device 110.

The request may be initiated by the user within the mobile banking application or web browser on the computing device 110. For example, responsive to the user creating an account, the server computer system 120 may send, via the communications module and to the computing device 110, a signal causing the computing device 110 to display a graphical user interface (GUI). The GUI may be used to communicate with the server computer system 120.

An example GUI 600 is shown in FIG. 5. As can be seen, the GUI includes one or more selectable options associated with a request to provision a data record for a service. Specifically, the GUI 600 includes a first selectable option 610 associated with a request to open a chequing account, a second selectable option 620 associated with a request to open a savings account, a third selectable option 630 associated with a request to open an investment account, and a fourth selectable option 640 associated with a request to open a credit card account. In this embodiment, each selectable option 610, 620, 630, 640 is in the form of a checkbox that may be selected or de-selected in response to user input on a display screen of the computing device 110. For example, the user may perform a tap gesture on the display screen of the computing device 110 at a location corresponding to one of the selectable options and this may select or de-select the selectable option. Put another way, a tap gesture may be used to toggle selection of the selectable option.

Figure 6:
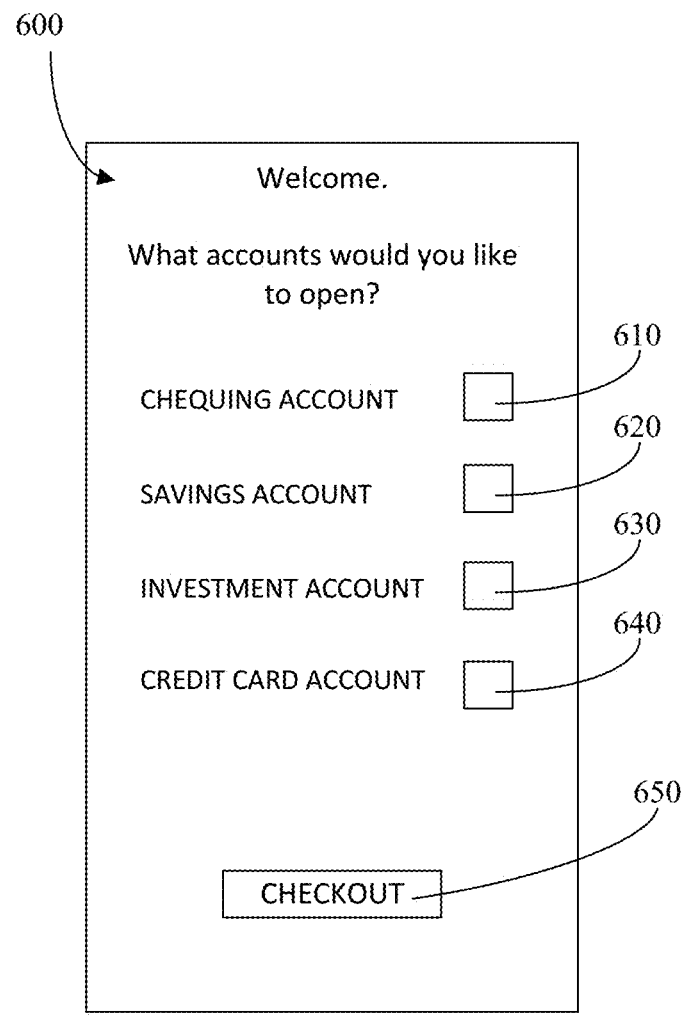
FIG. 6 is an example graphical user interface according to an embodiment.

Responsive to the user selecting a selectable option, the GUI 600 may be updated to display a symbol such as for example a check mark indicating selection of the selectable option. Responsive to the user de-selecting a selectable option, the GUI 600 may be updated to remove the symbol and this may indicate that the selectable option is not selected. In the example shown in FIG. 6, the user may select one or more of the selectable options 610, 620, 630, 640.

The GUI 600 also includes a selectable option 650 that, when selected, sends a signal to the server computer system 120 that includes a request to provision a data record for a service. It will be appreciated that in embodiments where the user has selected more than one of the selectable options 610, 620, 630, 640, the signal includes a request to provision a data record for a service for each selected option. For example, the user may submit a request to open a chequing account and a savings account and as such the signal includes a request to provision a data record for the chequing account and a request to provision a data record for the savings account, where the data record for the chequing account is a different data record than the data record for the savings account.

As mentioned, prior to provisioning the data record for the service, the server computer system 120 must verify the identity of the user.

The server computer system 120 selects digital identity network verification as a primary verification technique (step 520). In this embodiment, the server computer system 120 may select digital identity network verification by default or in response to user input.

Figure 7:
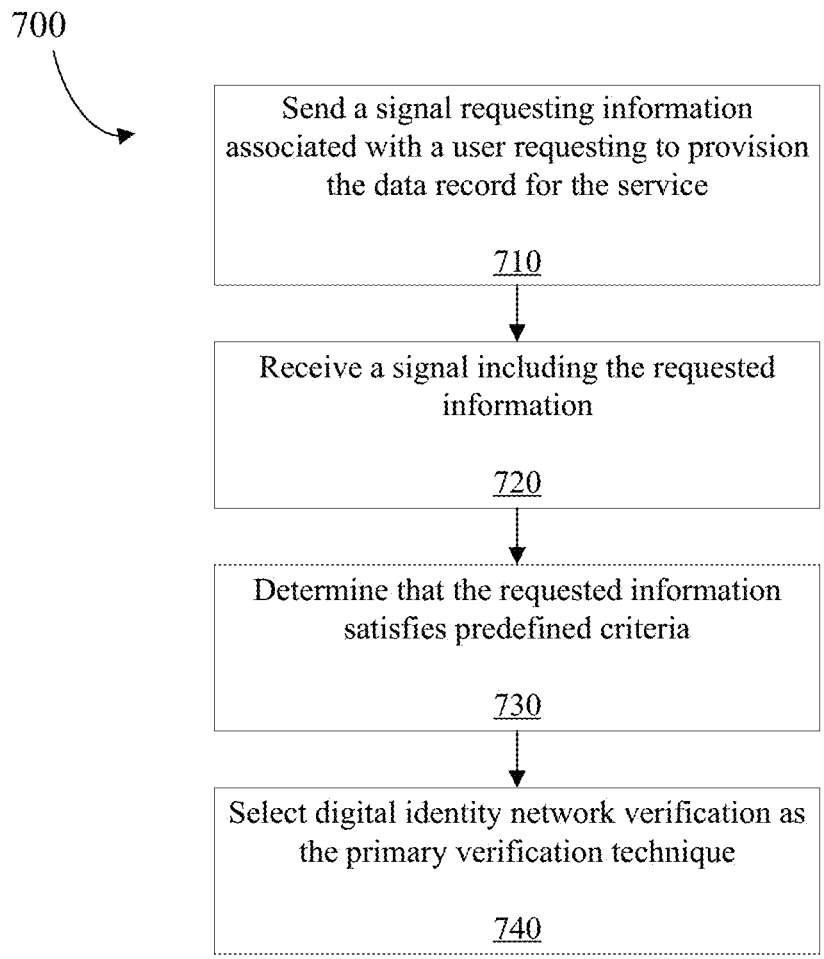
FIG. 7 is a flowchart showing operations performed by a server in selecting digital identity network verification as a primary verification technique according to an embodiment.

FIG. 7 is a flowchart showing operations performed by the server computer system 120 in selecting digital identity network verification as a primary verification technique according to an embodiment. The operations may be included in a method 700 which may be performed by the server computer system 120. For example, computer-executable instructions stored in memory of the server computer system 120 may, when executed by one or more processors, configure the server computer system 120 to perform the method 700 or a portion thereof.

The server computer system 120 sends, via the communication module and to the remote computing device, a signal requesting information associated with a user requesting to provision the data record for the service (step 710). The remote computing device may be the computing device 110.

In this embodiment, the requested information may include information relating to one or more other data records of the user. For example, the requested information may include a request for a name of a third party entity hosting one or more other data records of the user. In some embodiments, the one or more other data records may include one or more bank accounts of the user and as such the name of the third party entity may be the name of another financial institution.

Figure 8:
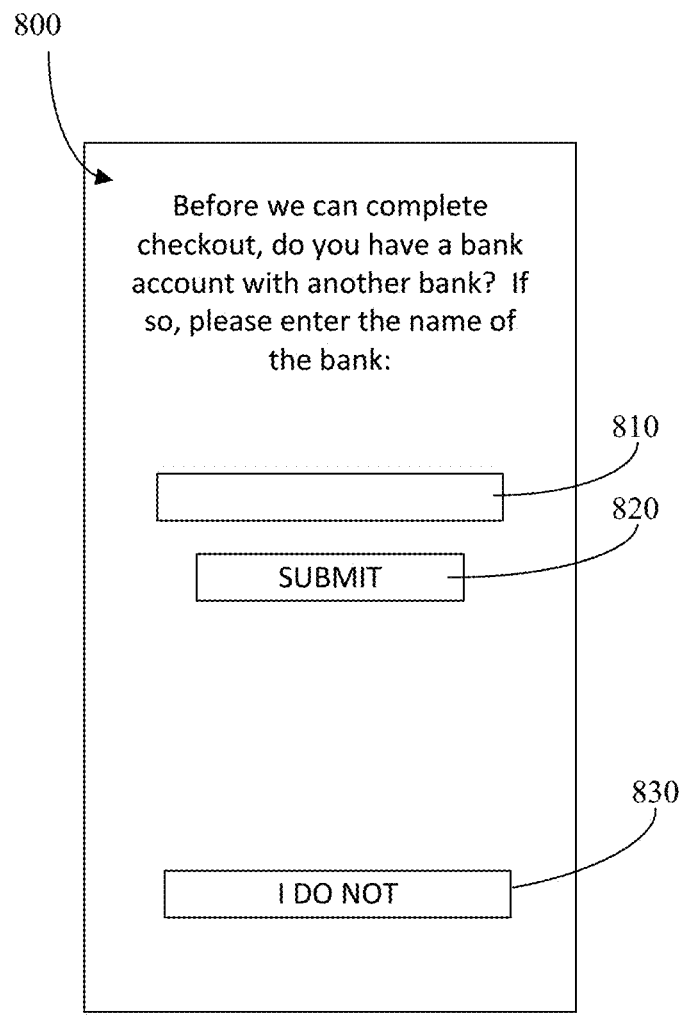
FIG. 8 is an example graphical user interface according to an embodiment.

The signal requesting information associated with the user may cause the computing device 110 to display a GUI 800 shown in FIG. 8. As can be seen, the GUI 800 includes a request for information ("Do you have a bank account with another bank? If so, please enter the name of the bank."). The GUI 800 includes an input field 810 that may be completed by the user using, for example, a virtual keyboard displayed on a display screen of the computing device 110. The GUI 800 includes a selectable option 820 to submit the requested information and a selectable option 830 to indicate that the user does not have a bank account with another bank.

The user may complete the input field 810 by entering the name of the other bank and may submit the requested information by selecting the selectable option 820. Responsive to the user selecting the selectable option 820, the computing device 110 sends a signal to the server computer system 120 that includes the requested information.

The server computer system 120 receives, via the communications module and from the remote computing device, the signal including the requested information (step 720).

The server computer system 120 determines that the requested information satisfies predefined criteria (step 730). The predefined criteria may include whether or not the other bank is a trusted member of the digital identity network.

The server computer system 120 may determine that the requested information satisfies predefined criteria by comparing the requested information to a list of trusted partners of the digital identity network. The list of trusted partners of the digital identity network may include one or more other banks. Put another way, the list of trusted partners may include one or more other banks that are associated with verified nodes that have been granted permission to write to the blockchain of the digital identity network. When the other bank is found in the list of trusted partners of the digital identity work the predefined criteria is satisfied.

Responsive to determining that the requested information satisfies predefined criteria, the server computer system 120 selects digital identity network verification as the primary verification technique (step 740). When it is determined that the user has an account at a bank that is a trusted partner of the digital identity network, the server computer system 120 selects digital identity network verification as the primary verification technique.

Figure 9:
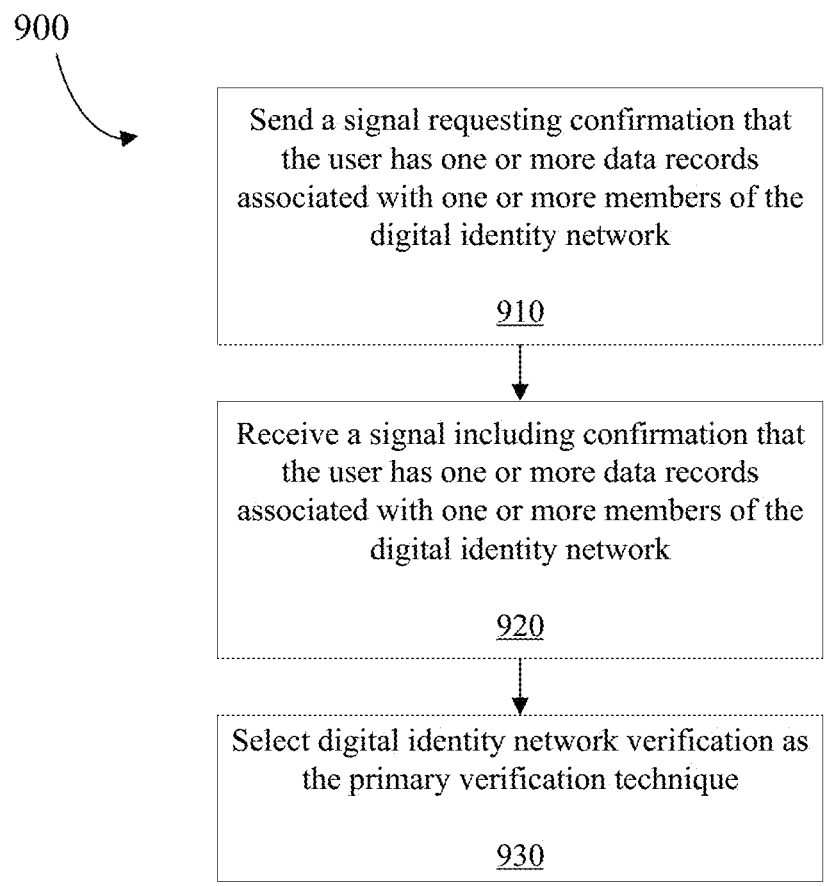
FIG. 9 is a flowchart showing operations performed by a server in selecting digital identity network verification as a primary verification technique according to an embodiment.

FIG. 9 is a flowchart showing operations performed by the server computer system 120 in selecting digital identity network verification as a primary verification technique according to another embodiment. The operations may be included in a method 900 which may be performed by the server computer system 120. For example, computer-executable instructions stored in memory of the server computer system 120 may, when executed by one or more processors, configure the server computer system 120 to perform the method 900 or a portion thereof.

The server computer system 120 sends, via the communication module and to the remote computing device, a signal requesting confirmation that the user has one or more data records associated with one or more members of the digital identity network (step 910).

In this embodiment, the server computer system 120 requests confirmation that the user has one or more data records associated with one or more members of the digital identity network, that is, one or more trusted members. For example, the request may be confirmation that the user has a bank account at least at one other bank that is a member of the digital identity network.

Figure 10:
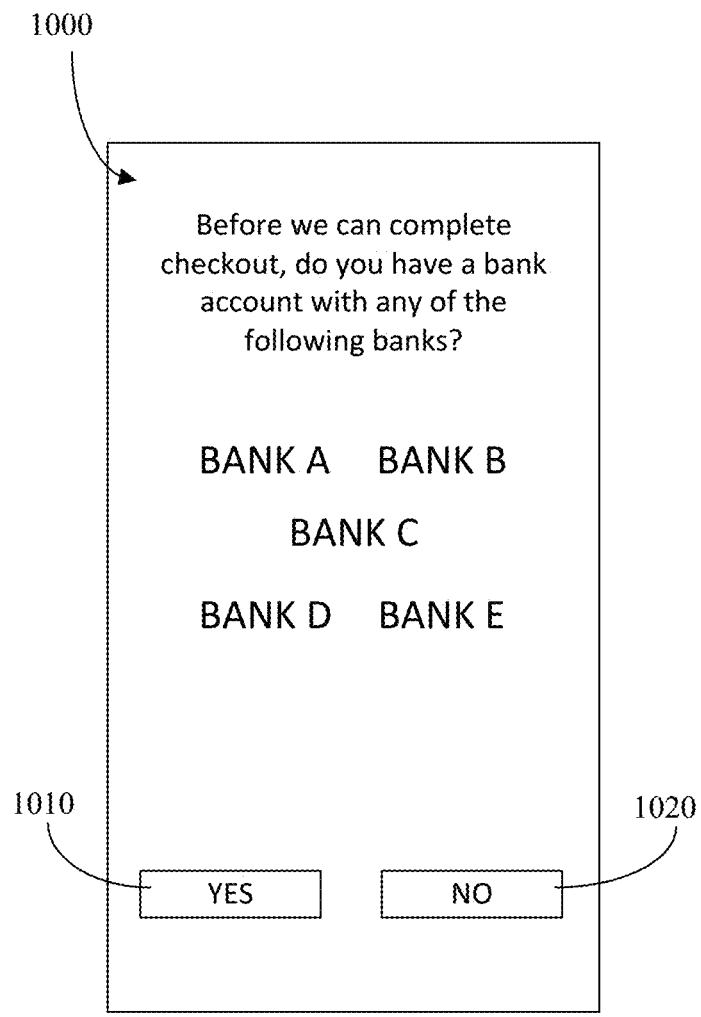
FIG. 10 is an example graphical user interface according to an embodiment.

The signal requesting confirmation may cause the computing device 110 to display a GUI 1000 shown in FIG. 10. As can be seen, the GUI 1000 includes a request for confirmation that the user has one or more data records with one or more members of the digital identity network ("Do you have a bank account with any of the following banks?"). The GUI 1000 displays a list of all banks that are members of the digital identity network. The GUI 1000 includes a selectable option 1010 to confirm that the user has a bank account at one of the other banks and a selectable option 1020 to indicate that the user does not have a bank account at one of the other banks.

The user may confirm that they have a bank account at one of the other banks by selecting the selectable option 1010. Responsive to the user selecting the selectable option 1010, the computing device sends a signal to the server computer system 120 that includes the confirmation. In this manner, the user is not required to enter the name of their bank but is simply required to indicate that they have a bank account at a bank that is a member of the digital identity network.

The server computer system 120 receives, via the communications module and from the remote computing device, the signal including confirmation that the user has one or more data records associated with one or more members of the digital identity network (step 920).

The server computer system 120 selects digital identity network verification as the primary verification technique based on the confirmation (step 930). When it is determined that the user has an account at a bank that is a trusted partner of the digital identity network, the server computer system 120 selects digital identity network verification as the primary verification technique.

Through use of one of the methods 700 and 900 described herein, the user is requested to provide information that is not directly related to the digital identity network. That is, the user may be unaware that they are able to verify their identity via the digital identity network. By simply identifying that the user has an account with another trusted member of the digital identity network, the server computer system 120 is able to select digital identity network verification as a primary verification technique.

The server computer system 120 attempts verification using the primary verification technique (step 530).

To attempt verification using the primary verification technique, the server computer system 120 sends, via the communications module and to the digital identity network server 130, a request for verified identity data of the user. In this embodiment, the request for verified identity data includes identity information of the user.

The identity information of the user includes information that may be used to uniquely identify the user. In this embodiment, the identity information may include at least some of the information previously obtained by the server computer system 120 when creating the account. For example, the identity information may include the email address of the user. Other examples include the full legal name and address of the user, an identity document number of the user (drivers license number, etc.), a social insurance number (SIN), etc.

In response to receiving the request for verified identity data, the digital identity network server 130 sends a request for verified identity data of the user to the trusted partners within the digital identity network. The request includes the identity information of the user. For example, the request may include a request for verified identity data of the user based on the email address of the user.

Verification using the primary verification technique is determined to be successful when one of the trusted members of the digital identity network provides verified identity data in response to receiving a request from the digital identity network server. For example, one of the trusted members of the digital identity network may act as a digital asset provider and thus may provide the requested verified identity data of the user to the digital identity network server 130. The digital identity network server 130 may provide the requested verified identity data to the server computer system 120. As such, the server computer system 120 acts as a digital asset consumer. The requested verified identity data is provided through the digital identity network in a blind manner such that the digital asset provider does not know the identity of the digital asset consumer and such that the digital asset consumer does not know the identity of the digital asset provider.

It will be appreciated that in some embodiments, the digital identity network server 130 may send a signal to the computing device 110 that includes a request to release verified identity data to the server computer system 120. The user may grant permission to release verified identity data to the server computer system 120 by selecting a selectable option included with the request. In response to the user granting permission, the digital identity network server 130 may release the requested verified identity data to the server computer system 120.

The verified identity data may include additional identity information of the user and may include information indicating that the identity of the user has been verified or authenticated by the digital asset provider. In this manner, the verified identity data of the user received via the digital identity network is sufficient to provision the data record for the service. Put another way, the digital asset provider previously verified the identity of the user and as such this verification may be trusted by the financial institution associated with the server computer system 120.

Verification using the primary verification technique is determined to fail when the digital identity network server 130 does not receive verified identity data from any of the trusted members of the digital identity network. For example, not one of the trusted members of the digital identity network may have verified identity data of the user and as such the digital identity network server 130 may not receive verified identity data in response to the request. It may be that the user has an account with one of the trusted members of the digital identity network however the verified identity data may be out of date and/or may not be complaint with the requirements of the digital identity network.

The server computer system 120 determines that verification using the primary verification technique has failed (step 540).

In this embodiment, the digital identity network server 130 may send, via the communications module and to the server computer system 120, a signal indicating that no verified identity data has been received from any of the trusted members of the digital identity network. Put another way, the signal may indicate that the request for verified identity data of the user has failed. Responsive to receiving the signal, the server computer system 120 may determine that verification using the primary verification technique has failed.

As mentioned, the user may be required to grant permission to release verified identity data to the server computer system 120 by selecting a selectable option included with a request that is sent to the computing device 110. The user may not wish to release the verified identity data to the server computer system 120 and as such the user may select a selectable option indicating that the user does not agree to release verified identity data to the server computer system 120. Responsive to the user selecting the selectable option indicating that the user does not agree to release the verified identity data to the server computer system 120, a signal may be sent from the computing device 110 to the digital identity network server 130 indicating that the user does not agree to release the verified identity data. In turn, the digital identity network server 130 may send a signal indicating that the user has not agreed to release the verified identity data. Responsive to receiving the signal, the server computer system 120 may determine that verification using the primary verification technique has failed.

Responsive to determining that verification using the primary verification technique has failed, the server computer system 120 attempts verification using a secondary verification technique (step 550).

The secondary verification technique is a backup technique and may not require the digital identity network. As one example of a secondary verification technique, the server computer system 120 may send, via the communications module and to the computing device 110, a request for identity data of the user. The requested identity data may be a request for an image of an identification card of the user and an image of the user. Using the camera associated with the computing device 110, the user may capture an image of their identification card and may capture an image of themselves and send the captured images as image data to the server computer system 120. The server computer system 120 may analyze the image data using image processing techniques to ensure that the image of the user matches the picture on the identification card and this may be used to verify the identity of the user.

As another example, the secondary verification technique may require identity data and this may be obtained from an image of an identification card of the user. In this example, the server computer system 120 may send a signal to the computing device 110 requesting an image of an identification card of the user. Using the camera associated with the computing device 110, the user may capture an image of their identification card and may send the captured image to the server computer system 120. The server computer system 120 may analyze the captured image to obtain data of the user. The data may include, for example, a name and an address of the user.

The server computer system 120 may additionally or alternatively verify the identity of the user using the internet protocol address of the computing device 110. For example, the server computer system 120 may obtain the internet protocol address of the computing device 110 and may determine a location of the computing device 110 based at least on the internet protocol address. For example, the server computer system 120 may determine a country, city or approximate address of the computing device 110 based on the internet protocol address. The determined location may be compared to a known address of the user and this may be used to verify the identity of the user.

The server computer system 120 may additionally or alternatively verify the identity of the user using location data received from the computing device 110. For example, the server computer system 120 may obtain location data from the computing device 110 and may analyze the location data to determine a location of the computing device 110. The determined location may be compared to a known address of the user and this may be used to verify the identity of the user.

The server computer system 120 determines successful verification using the secondary verification technique (step 560).

As one example, when it is determined that the image of the user matches the picture on the identification card, the server computer system 120 may determine successful verification using the secondary verification technique. As another example, when it is determined that the location of the computing device 110 corresponds to the known address of the user, the server computer system 120 determines successful verification using the secondary verification technique.

Responsive to successful verification using the secondary verification technique, the server computer system 120 provisions the data record for the service (step 570).

The data record may be provisioned for the requested service. For example, where the request to provision the data record for the service is a request for a chequing account, the server computer system 120 may provision the data record as a chequing account. As another example, where the request to provision the data record for the service is a request for a savings account, the server computer system 120 may provision the data record as a savings account.

It will be appreciated that, during step 530 of method 500, the primary verification technique may be determined to be successful. For example, the server computer system 120 may receive the requested verified identity data from the digital identity network server 130 and as such verification using the primary verification technique may be determined to be successful. Responsive to determining that the primary verification technique is successful, the account is provisioned for the requested service in manners similar to that described herein.

In one or more embodiments, the secondary verification technique may be determined to have failed. As such, a third verification technique may be attempted. For example, the secondary verification technique may include comparing an image of an identification card to an image of the user. Where the images are determined not to represent the same person, the secondary verification technique may be determined to have failed. As such, a third verification technique may be attempted and may include sending a signal to a third party server requesting credit data. The credit data may include a credit score of the user and this may be compared to a credit score threshold to determine if the user has a credit score sufficient to provision the data record for the service.

In one or more embodiments, after a number of verification techniques have been attempted and failed, the request to provision the data record for the service may not be completed. For example, after three verification attempts have failed using three different verification techniques, the request to provision the data record for the service may not be completed and the server computer system 120 may send a signal causing the computing device 110 to display a message indicating the failure.

Although in embodiments described herein the user is required to create an account prior to submitting a request to provision a data record for a service, in one or more other embodiments the account may be created after the request to provision the data record for the service has been completed. For example, the server computer system 120 may request identifying information of the user and, using the identifying information of the user, may attempt to verify the identity of the user using techniques described herein. Responsive to successful verification, the data record may be provisioned for the service and an account may be created for the user. The user may then be required to create a username and password associated with the account.

As mentioned, the user may submit multiple requests to provision an account for a service simultaneously. For example, the user may request that a chequing account and a savings account be opened. The system described herein may only be required to verify the identity data of the user once and, responsive to successful verification, the server computer system 120 may provision the data records for the services. For example, the server computer system 120 may provision a first data record as a chequing account and a second data record as a savings account.

Although in embodiments, identity verification is described as being required only for new users or customers, identity verification may additionally be required for existing customers who have not verified their identity within a particular time period. For example, an existing customer may have a non-compliant profile and as such may be required to verify their identity. A non-compliant profile may occur when an account was initially set up prior to a change in regulations.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
a communications module;
a processor coupled with the communications module; and
a memory coupled to the processor and storing processor-executable instructions which, when executed by the processor, configure the processor to:
receive, via the communications module and from a remote computing device, a signal including a request to provision a data record for a service;
send, via the communication module and to the remote computing device, a signal requesting confirmation that a user has one or more data records associated with one or more members of a digital identity network;
receive, via the communications module and from the remote computing device, a signal including confirmation that the user has one or more data records associated with one or more members of the digital identity network;
select digital identity network verification via the digital identity network as a primary type of authentication based on the confirmation;
attempt verification using the primary type of authentication;
determine that verification using the primary type of authentication has failed;
responsive to determining that verification using the primary type of authentication has failed, stop the attempt of verification using the primary type of authentication and attempt verification using a secondary type of authentication that does not require the digital identity network;
determine successful verification using the secondary type of authentication; and
responsive to successful verification using the secondary type of authentication, provision the data record for the service.

2. The server computer system of claim 1, wherein the processor-executable instructions, when executed by the processor, further configure the processor to:
send, via the communication module and to the remote computing device, a signal requesting information associated with a user requesting to provision the data record for the service;
receive, via the communications module and from the remote computing device, a signal including the requested information;
determine that the requested information satisfies predefined criteria; and
responsive to determining that the requested information satisfies predefined criteria, select digital identity network verification as the primary type of authentication.

3. The server computer system of claim 2, wherein the requested information includes information relating to one or more other data records of the user.

4. The server computer system of claim 1, wherein the digital identity network includes a permissioned blockchain network.

5. The server computer system of claim 1, wherein when attempting verification using the primary type of authentication, the processor-executable instructions, when executed by the processor, further configure the processor to:
send, via the communications module and to a server associated with the digital identity network, a request for verified identity data of a user.

6. The server computer system of claim 5, wherein the processor-executable instructions, when executed by the processor, further configure the processor to:
receive, via the communications module and from the server associated with the digital identity network, a signal indicating that the request for verified identity data of the user has failed; and
responsive to receiving the signal indicating that the request for verified identity data of the user has failed, determine that verification using the primary type of authentication has failed.

7. The server computer system of claim 1, wherein when attempting verification using the secondary type of authentication, the processor-executable instructions, when executed by the processor, further configure the processor to:
obtain, via the communications module and from the remote computing device, image data including a first image of a user and an image of an identity document that includes a second image of the user;
analyze the image data to determine that the first image of the user and the second image of the user correspond to a same user; and
responsive to determining that the first image of the user and the second image of the user correspond to the same user, determine successful verification.

8. The server computer system of claim 1, wherein when attempting verification using the secondary type of authentication, the processor-executable instructions, when executed by the processor, further configure the processor to:
obtain, via the communications module and from the remote computing device, an internet protocol address of the remote computing device;
determine a location of the remote computing device based at least on the internet protocol address; and
compare the determined location of the remote computing device to a known address of a user to determine successful verification.

9. A computer-implemented method comprising:
receiving, via a communications module and from a remote computing device, a signal including a request to provision a data record for a service;
sending, via the communication module and to the remote computing device, a signal requesting confirmation that a user has one or more data records associated with one or more members of a digital identity network;
receiving, via the communications module and from the remote computing device, a signal including confirmation that the user has one or more data records associated with one or more members of the digital identity network;
selecting digital identity network verification via the digital identity network as a primary type of authentication based on the confirmation;
attempting verification using the primary type of authentication;
determining that verification using the primary type of authentication has failed;
responsive to determining that verification using the primary type of authentication has failed, stopping the attempt of verification using the primary type of authentication and attempting verification using a secondary type of authentication that does not require the digital identity network;
determining successful verification using the secondary type of authentication; and
responsive to successful verification using the secondary type of authentication, provisioning the data record for the service.

10. The computer-implemented method of claim 9 further comprising:
sending, via the communication module and to the remote computing device, a signal requesting information associated with a user requesting to provision the data record for the service;
receiving, via the communications module and from the remote computing device, a signal including the requested information;
determining that the requested information satisfies predefined criteria; and
responsive to determining that the requested information satisfies predefined criteria, selecting digital identity network verification as the primary type of authentication.

11. The computer-implemented method of claim 10, wherein the requested information includes information relating to one or more other data records of the user.

12. The computer-implemented method of claim 9, wherein the digital identity network includes a permissioned blockchain network.

13. The computer-implemented method of claim 9, wherein attempting verification using the primary type of authentication comprises:
sending, via the communications module and to a server associated with the digital identity network, a request for verified identity data of a user.

14. The computer-implemented method of claim 13, further comprising:
receiving, via the communications module and from the server associated with the digital identity network, a signal indicating that the request for verified identity data of the user has failed; and
responsive to receiving the signal indicating that the request for verified identity data of the user has failed, determining that verification using the primary type of authentication has failed.

15. The computer-implemented method of claim 9, wherein attempting verification using the secondary type of authentication comprises:
obtaining, via the communications module and from the remote computing device, image data including a first image of a user and an image of an identity document that includes a second image of the user;
analyzing the image data to determine that the first image of the user and the second image of the user correspond to a same user; and
responsive to determining that the first image of the user and the second image of the user correspond to the same user, determining successful verification.

16. A non-transitory computer readable storage medium comprising computer-executable instructions which, when executed, configure a processor to:
receive, via a communications module and from a remote computing device, a signal including a request to provision a data record for a service;
send, via the communication module and to the remote computing device, a signal requesting confirmation that a user has one or more data records associated with one or more members of a digital identity network;
receive, via the communications module and from the remote computing device, a signal including confirmation that the user has one or more data records associated with one or more members of the digital identity network;
select digital identity network verification via a digital identity network as a primary type of authentication based on the confirmation;
attempt verification using the primary type of authentication;
determine that verification using the primary type of authentication has failed;
responsive to determining that verification using the primary type of authentication has failed, stop the attempt of verification using the primary type of authentication and attempt verification using a secondary type of authentication that does not require the digital identity network;
determine successful verification using the secondary type of authentication; and
responsive to successful verification using the secondary type of authentication, provision the data record for the service.

* * * * *